INVENTOR
JOHN G. RAYMOND
ATTORNEY

United States Patent Office 3,460,408
Patented Aug. 12, 1969

3,460,408
DEPTH GAUGE
John G. Raymond, Bernardston, Mass., assignor to Millers Falls Company, Greenfield, Mass., a corporation of Massachusetts
Filed Mar. 14, 1967, Ser. No. 628,213
Int. Cl. B23b 47/60
U.S. Cl. 77—55                                                                                1 Claim

ABSTRACT OF THE DISCLOSURE

A depth gauge adaptor or stop for attachment to a power tool such as a screwdriver or drill to limit and prevent the tool from further approaching the work surface after the tool bit reaches a selected depth. The adaptor includes three pieces, a body, a stop tube adjustably threaded in the body to adjust to the selected depth and a lock ring slidably mounted on the body to lock the stop tube in an adjusted position.

Summary of invention

The principal object of this invention is to provide a depth gauge or stop for use on a power tool which will provide a fast, accurate and positive adjustment of the distance that a power tool will drive a fastener or its bit.

Further important objects of this invention are: to provide a depth gauge or stop adaptor which can be readily mounted on a power tool, such as a screwdriver or a drill; and to provide a depth gauge for a screwdriver which can be quickly and easily adjusted to a selected depth for stopping the advance of the tool when it reaches the selected depth or disengaging the tool from a fastener when the fastener reaches the selected depth.

In general, the foregoing objects are attained by providing a depth gauge adaptor comprising a hollow annular body adapted to be mounted on the front end of a power tool surrounding the tool bit, adjustably threading a hollow stop tube into the annular body by means of internal threads in the annular body, slidably mounting a lock sleeve on the body with means adapted to engage teeth on the stop tube to lock the stop tube in a selected position in the body, and arranging resilient means in the body to urge the lock sleeve forward against the stop tube for locking purposes.

Brief description of drawing

The invention is described in connection with the accompanying drawings wherein.

Description of preferred embodiments

Figures 1, 2, 3:
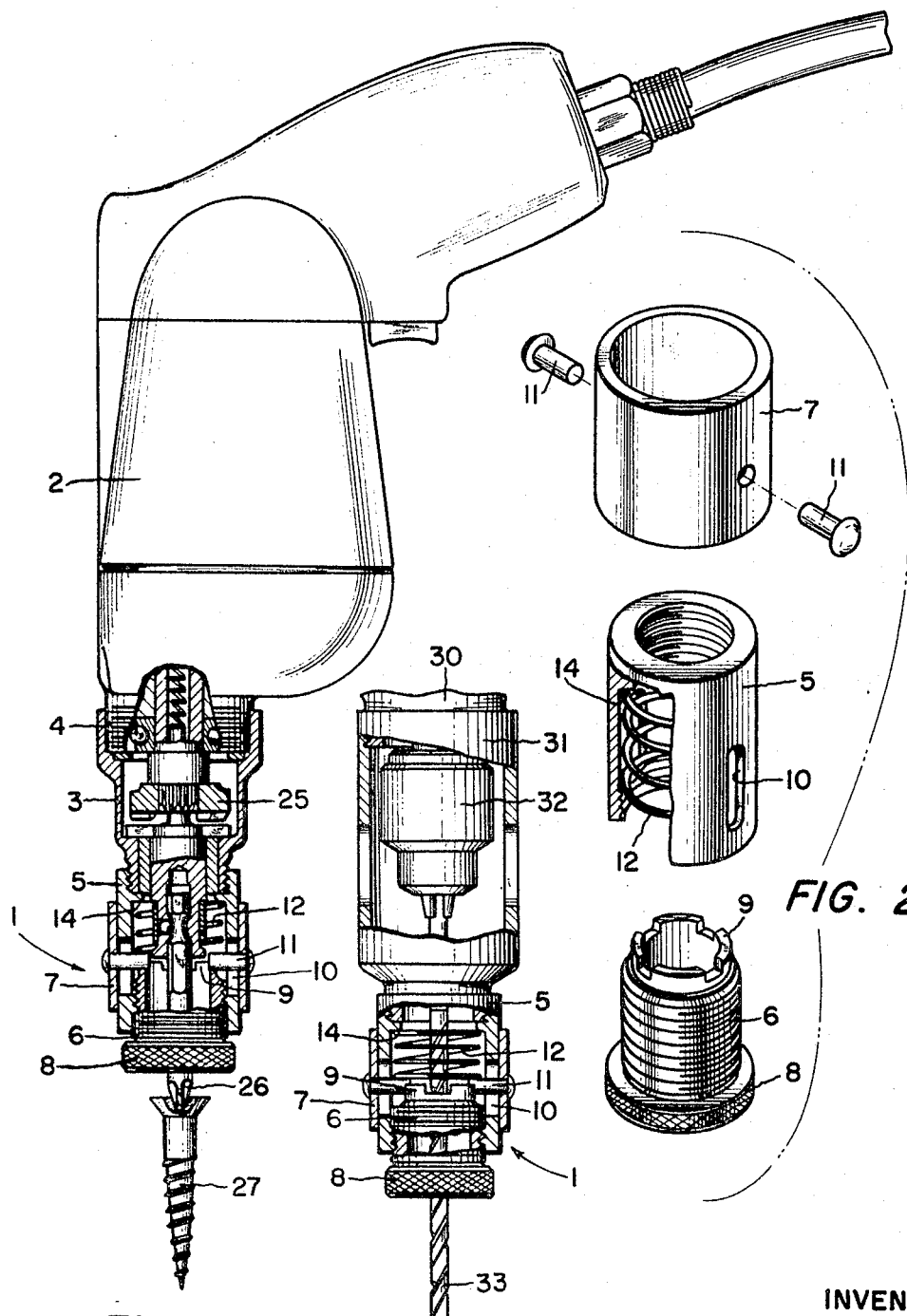
FIG. 1 is an elevational view with portions being cut away and illustrating a conventional power screwdriver carrying the adaptor depth gauge or stop of this invention.
FIG. 2 is an exploded perspective view with portions being cut away and illustrating details of the gauge adaptor of this invention.
FIG. 3 is a fragmentary elevational view similar to FIG. 1 showing the adaptor mounted on a conventional power drill.

The depth gauge adaptor 1 is shown in FIG. 1 mounted on a conventional electric screwdriver 2 with the depth gauge 1 being mounted on the front end or nose 3 of the screwdriver 2 by a suitable threaded connection 4. The nose 3 is provided with the threads 4 to adapt the screwdriver 2 for use with the depth gauge 1.

The depth gauge adaptor 1 comprises three parts, namely, an annular body 5, a stop tube 6 threaded into a lower portion of the annular body 5 and a lock ring 7 mounted on the annular body 5. The stop tube 6 includes a foot flange 8 surrounding its lower edge and adapted to abut a workpiece for limiting the working depth of the power tool 2. The stop tube 6 is threaded into the body and is adjusted to a selected depth by its position in the threads in the body 5.

The upper edge of the stop tube 6 includes several spaced teeth 9 for cooperation with the lock ring 7 to lock the stop tube 6 in its adjusted position in the body 5. The body 5 includes a pair of diametrically-opposed longitudinally-extending slots 10. A pair of pins 11 are mounted on the lock ring 7 and extend radially inward through the slots 10 where they can engage the teeth 9, when the lock ring 7 is urged axially forwardly, to lock the stop tube 6 within the annular body 5. A spring 12 is located within the annular body 5 and engages the pins 11 to urge them forwardly into the notches between the teeth 9 when the stop tube 6 has been properly adjusted.

The upper end of the spring 12 engages against an internal shoulder 14 located in the upper end of the annular body 5. The pins 11 are withdrawn from the teeth 9 by sliding the lock ring 7 upwardly on the body 5 whereby the stop tube 6 can be readily adjusted to a desired position within the body 5, by turning it in the necessary rotary direction to either lengthen or shorten the total length of the adaptor 1. Once the stop tube 6 is properly adjusted, the lock ring 7 is allowed to come forwardly so that the pins 11 engage the teeth 9 and hold the stop tube 6 in the adjusted position.

In explaining the operation of the invention, it should be understood that the screwdriver 2 includes a clutch 25 which is automatically engaged by the retraction of the screwdriver bit 26 as the result of the operator pushing the bit 26 axially forward against the head of a fastener 27. The clutch 25 automatically opens when axial pressure on the bit 26 is released.

After the stop tube 6 is properly adjusted, the screwdriver 2 is ready for use. To drive a fastener 27, the screwdriver bit 26 is located in the head of the fastener 27 and pushed axially forward to engage the clutch 25. At the same time, the motor of the screwdriver 2 is energized to begin driving the fastener 27. The fastener 27 is driven into the work surface until the foot flange 8 on the stop tube 6 engages the work surface. After the foot flange 8 engages the work surface, the screwdriver 2 continues to drive the fastener 27 into the work surface and the bit 26 is urged to follow the fastener 27 until the clutch 25 opens. After this, the operator can wihdraw the bit 26 from the fastener head. The screwdriver 2 is now ready for driving additional fasteners.

Second embodiment

The depth gauge adaptor 1 is shown in FIG. 3 mounted on a conventional electric drill 30 carrying a spacer sleeve 31 on the front end of the drill 30 with the depth gauge 1 being mounted on the front end of the spacer sleeve 31 by a suitable threaded connection. The spacer sleeve 31 surrounds a chuck 32 carrying a drill bit 33.

Although two preferred embodiments of the invention are illustrated and described in detail, it should be understood that the invention is not limited simply to these embodiments, but contemplates other embodiments and variations which utilize the concepts and teachings of this invention.

What is claimed is:

1. A depth gauge adaptor for use with a power tool including a front end carrying a bit, comprising:

A hollow annular body adapted to be mounted on the front end of the power tool surrounding the tool bit and containing a longitudinally extending slot;

a hollow stop tube having one end adjustably and internally threaded within said annular body for engaging a workpiece at a selected depth of the tool bit for stopping the tool from moving closer to the workpiece and having teeth located on said one end;

a lock sleeve surrounding and slidably mounted on the exterior of said body and including lock means projecting radially inwardly through said slot and adapted to engage with said teeth on said stop tube to lock said stop tube in a selected position in said body; and resilient means contained within said hollow annular body and urging said lock sleeve into a locking position with said stop tube.

References Cited

UNITED STATES PATENTS

| | | | |
|---|---|---|---|
| 2,242,510 | 5/1941 | Cogsdill | 77—55 |
| 2,381,087 | 8/1945 | Stewart | 77—55 |
| 2,794,353 | 6/1957 | Bashlow et al. | 77—55 |

FRANCIS S. HUSAR, Primary Examiner

U.S. Cl. X.R.

144—32